United States Patent
Stephenson

(10) Patent No.: US 8,851,768 B1
(45) Date of Patent: Oct. 7, 2014

(54) SHUTTER WITH POWER-FREE BLADE RETURN

(71) Applicant: Melles Griot, Rochester, NY (US)

(72) Inventor: Stanley W. Stephenson, Spencerport, NY (US)

(73) Assignee: Melles-Griot, Rochester, NY (US)

( * ) Notice: Subject to any disclaimer, the term of this patent is extended or adjusted under 35 U.S.C. 154(b) by 0 days.

(21) Appl. No.: 13/918,024

(22) Filed: Jun. 14, 2013

(51) Int. Cl.
  *G03B 9/08* (2006.01)
  *G03B 9/10* (2006.01)

(52) U.S. Cl.
  CPC .................................. *G03B 9/10* (2013.01)
  USPC .......................................... 396/463

(58) Field of Classification Search
  USPC ........................................... 396/463
  See application file for complete search history.

(56) References Cited

U.S. PATENT DOCUMENTS

| | | | |
|---|---|---|---|
| 2,486,169 A | 10/1949 | Kaplowitz | |
| 3,604,330 A | 9/1971 | Fahlenberg et al. | |
| 4,312,583 A | 1/1982 | Ohniwa et al. | |
| 4,868,695 A | 9/1989 | Quatro et al. | |
| 5,155,522 A | 10/1992 | Castor et al. | |
| 5,159,382 A | 10/1992 | Lee et al. | |
| 5,173,728 A | 12/1992 | Sangregory et al. | |
| 5,325,142 A * | 6/1994 | Depatie et al. | 396/449 |
| 5,497,093 A | 3/1996 | Sundeen et al. | |
| 5,502,524 A | 3/1996 | Bovenzi et al. | |
| 5,705,873 A * | 1/1998 | Sato | 310/193 |
| 5,883,557 A | 3/1999 | Pawlak et al. | |
| 6,123,468 A | 9/2000 | Furlani et al. | |
| 6,530,703 B2 | 3/2003 | Nakano et al. | |
| 6,652,165 B1 | 11/2003 | Pasquarella et al. | |
| 6,705,776 B2 * | 3/2004 | Watanabe | 396/463 |
| 7,649,300 B2 * | 1/2010 | Watanabe | 396/508 |
| 7,701,691 B2 | 4/2010 | Brundisini et al. | |
| 7,845,865 B2 | 12/2010 | Viglione et al. | |

OTHER PUBLICATIONS

David Durfee, Walter Johnson, Scott McLeod "Advanced electromechanical micro-shutters for thermal infrared night vision imaging and targeting systems", Infrared Technology and Applications XXXIII, Proc. of SPIE, vol. 6542, 65422C (2007).
Frank DeWitt, David Durfee, Stanley Stephenson, "Shutter Subsystems for Infrared Imagers" Society of Photo-Optical Instrumentation Engineers, (2010). CVI Melles Griot, White Paper.
Commonly assigned co-pending U.S. Appl. No. 13/463,981 to Stephenson, filed May 4, 2012.

* cited by examiner

*Primary Examiner* — W B Perkey
(74) *Attorney, Agent, or Firm* — Louis S. Horvath

(57) ABSTRACT

An optical shutter apparatus has a shutter blade that is movable between a first position, blocking at least a portion of an aperture and a second position spaced apart from the first position. A rotary actuator has a stator and a magnetic rotor element that is coupled to the shutter blade. The rotary actuator is energizable for moving the shutter blade between the first and second positions, wherein the rotor element rotates about an axis that lies within the stator. At least one permanent magnet is coupled to the stator and provides a magnetic field that biases the stator to provide a continuous urging force on the magnetic rotor element.

14 Claims, 11 Drawing Sheets

SHUTTER WITH POWER-FREE BLADE RETURN

FIELD OF THE INVENTION

The present invention relates generally to optical shutter apparatus and more particularly relates to optical shutter apparatus with a bistable actuator and having a blade-return mechanism that operates automatically when power is removed.

BACKGROUND OF THE INVENTION

Optical shutters use an actuator to drive each of one or more radiation-blocking elements or "shutter blades", between a first, closed position that blocks the path of light through at least a portion of an aperture and a second, open position that is spaced apart from the first position and that allows light through the aperture. The light radiation that is directed toward the aperture can generally be any form of electromagnetic radiation, such as ultra-violet, visible or infrared radiation, for example. The aperture can be in a frame that is directly or indirectly coupled to the actuator. The frame can additionally support the actuator and typically includes features that retain the shutter blade or blades and that define the travel path of the shutter blade or blades. The actuator can be electromagnetically activated (an "electromagnetic actuator") so that it responds to an electrical signal to translate the shutter blade or blades between the open and closed positions. Electromagnetic actuators typically used for this purpose include linear solenoids, rotary solenoids, or brushed or brushless commutated motors, for example.

Actuators for optical shutters can be monostable or bistable. Monostable shutters have a single stable position to which the actuator returns when power is removed. Bistable actuators are able to remain in the last position held at the time power is removed.

Monostable solenoid actuators have a coil of wire that generates a magnetic field when electrical power is applied. The magnetic field applies a force to pull or rotate a soft magnetic core in a given direction. Monostable actuators with soft magnetic cores typically utilize a spring or other mechanical element to return the core to an original position when power is removed. One disadvantage of monostable actuators for shutter control relates to their behavior upon power loss; these actuators require continuous power to remain in the electrically driven state.

Bistable actuators are stable in the state held when power is removed, whether open or closed. Bistable actuators can be created using geared motor drives that lock in a given position when unpowered. In other embodiments, an over-center spring can be used to create a locking force in either of the open aperture or closed (blocked aperture) positions.

The soft magnetic core of a monostable solenoid can be replaced with a hard magnet that adheres to soft magnetic material in each of its two positions to create a bistable shutter. For example, the rotary drive solenoids (RDS) produced by Melles Griot are exemplary bistable rotary solenoids, each using a permanent magnet core. Further description of bistable actuators of this type can be found, for example, in *Proceedings of SPIE*, Vol. 6542, "Advanced electro-mechanical micro-shutters for thermal infrared night vision imaging and applications" by Durfee et al. Bistable actuators are advantaged for their small size and light weight. However, these actuators have their limitations. Because they typically have relatively small coil elements, bistable rotary actuators used for shutter applications can be damaged by the application of continuous power and are typically pulsed intermittently so that energy can be more quickly dissipated. These devices can be constrained in terms of travel arc, allowing the blade to swing over an arc of 20 degrees or less between open and closed positions. This, in turn, tends to limit the size of the aperture.

Thus, it can be seen that there is a need for an improved shutter apparatus that uses a bistable actuator that operates in a monostable mode, returning the shutter blade to a preferred position when power is removed, and that allows a larger aperture to be provided.

SUMMARY OF THE INVENTION

It is an object of the present invention to advance the art of optical shutter design. Embodiments of the present invention provide a shutter apparatus that has a bistable actuator that operates in a monostable mode so that actuator drive force operates in a single direction. Advantageously, the shutter apparatus of the present invention is capable of a larger sweep angle for the shutter blade, allowing an aperture having an expanded area over conventional monostable devices.

According to one aspect of the present invention, there is provided an optical shutter apparatus comprising:
  a shutter blade that is movable between a first position, blocking at least a portion of an aperture and a second position spaced apart from the first position;
  a rotary actuator having a stator and a magnetic rotor element that is coupled to the shutter blade and is energizable for moving between the first and second positions, wherein the rotor element rotates about an axis that lies within the stator; and
  a permanent magnet that is coupled to the stator and that provides a magnetic field that biases the stator to provide a continuous urging force on the magnetic rotor element.

According to an alternate aspect of the present invention, there is provided an optical shutter apparatus comprising:
  a shutter blade that is movable between a first position, blocking at least a portion of an aperture and a second position spaced apart from the first position; and
  a rotary actuator having a stator and a magnetic rotor element that is coupled to the shutter blade, wherein the rotary actuator is energizable for moving the shutter blade between the first and second positions, wherein the rotor element rotates about an axis that lies within the stator,
  and wherein the stator has a magnetic bias that provides a continuous urging force that tends to drive the magnetic rotor element to the first position.

According to another alternate aspect of the present invention, there is provided a method for blocking a light path comprising:
  coupling a shutter blade to a magnetic rotor element of a rotary actuator, wherein the magnetic rotor element is movable, about an axis that lies within a stator, between a first position and a second position, wherein the shutter blade blocks at least a portion of an aperture when the magnetic rotor element is at the first position;
  providing a magnetic bias to the stator of the rotary actuator, wherein the magnetic bias provides a magnetic field that biases the stator to provide a continuous urging force on the magnetic rotor element that urges the shutter blade toward the first position; and
  energizing a pulse-width modulator controller to switch a variable drive signal to the rotary actuator, wherein a pulse width of the drive signal varies with a rotation angle of the shutter blade.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
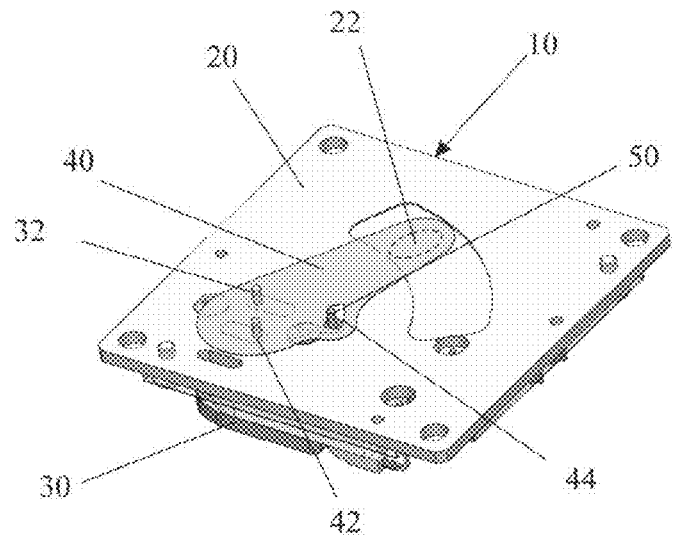
FIG. 1 is a perspective view of a conventional shutter apparatus that uses a bistable actuator.

Figures provided herein are given in order to illustrate principles of operation and component relationships according to the present invention and are not drawn with intent to show actual size or scale. Some exaggeration may be necessary in order to emphasize basic structural or functional relationships or principles of operation. Some conventional components that would be needed for implementation of the described embodiments, such as support components used for providing power, for packaging, and for mounting, for example, are not shown in the drawings in order to simplify description of the invention. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another. The term "plurality" means at least two.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces or views of an assembly or structure and physical relationships of components relative to each other and do not describe any necessary orientation of the assembly in an optical apparatus.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

Non-magnetic materials are materials that are negligibly affected by magnetic fields and that exhibit no perceptible magnetic attraction and are thus not perceptibly pulled toward a magnet. In general, non-magnetic materials have a low relative magnetic permeability, typically not exceeding 1.0 at room temperature. Some exemplary non-magnetic materials include copper, aluminum, standard stainless steel, and most metals and alloys; sapphire; various ceramics; wood and paper composite materials; glass; water; plastics and other polymers; fiberglass; and various composite materials such as phenolic materials. Magnetic materials have higher relative permeability and are considered to be "magnetically responsive", exhibiting magnetic attraction that can be readily perceived without requiring instrumentation; this includes ferromagnetic materials and various compounds of rare earth materials, for example.

Figure 2:
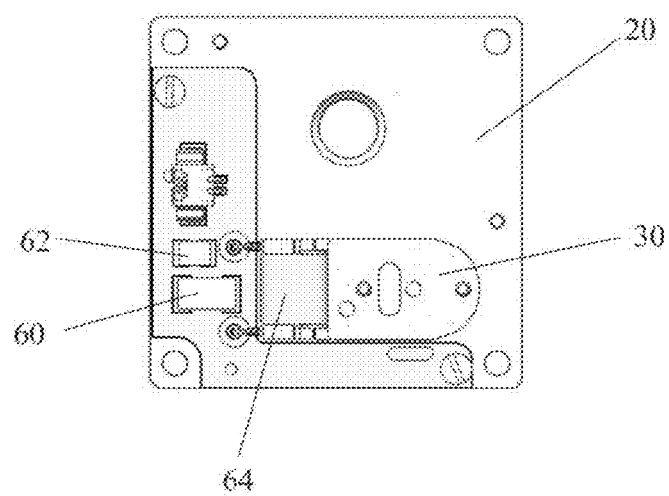
FIG. 2 is a plan view of a shutter apparatus that uses a bistable actuator.

The perspective view of FIG. 1 and the plan view of FIG. 2 show a shutter apparatus 10 that uses a bistable actuator 30. A frame 20 has an aperture 22 for placement along a light path in an optical system. A shutter blade 40 is shown blocking aperture 22 in FIG. 1. Actuator 30 drives shutter blade 40 between its open and closed positions using pins 32 that correspond to legs of the rotary actuator 30. A stop pin 50 projects from frame 20 through a stop opening 44 in blade 40. As is shown in FIG. 2, actuator 30 has a coil 64. A capacitor 60 and resistor 62 provide a decay drive voltage, as described in more detail subsequently.

Figure 3A:
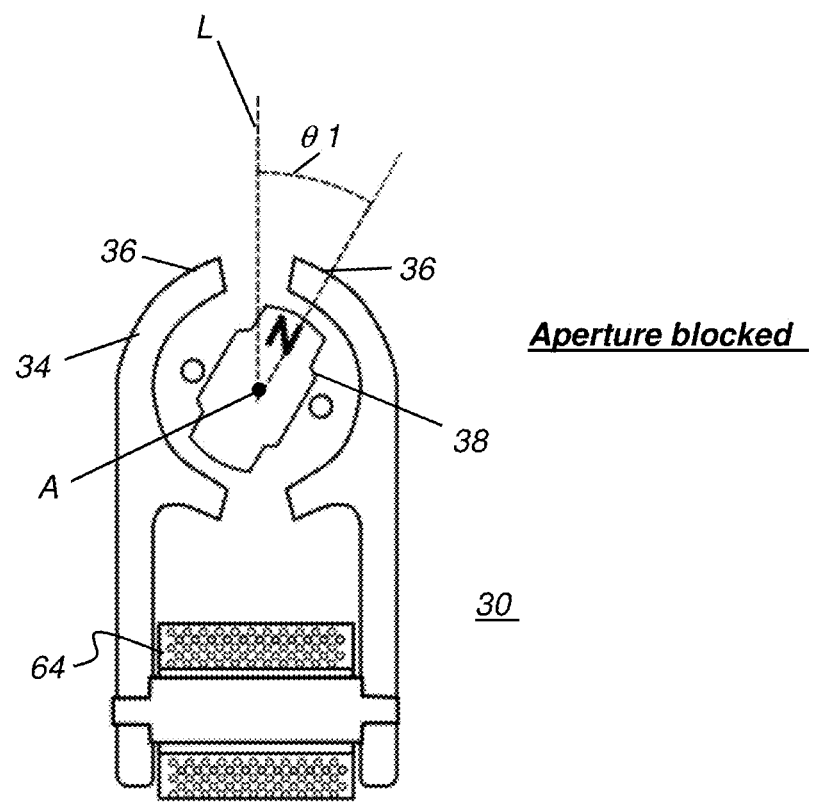
FIG. 3A is a plan view of a bistable actuator in a first position.
Figure 3B:
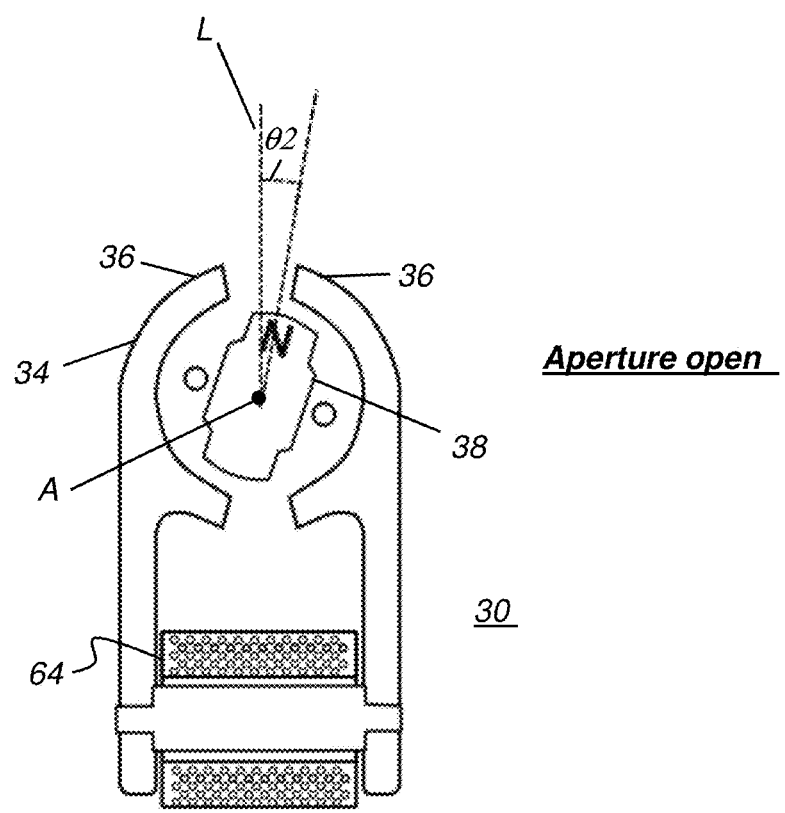
FIG. 3B is a plan view of a bistable actuator in a second position.
Figure 4:
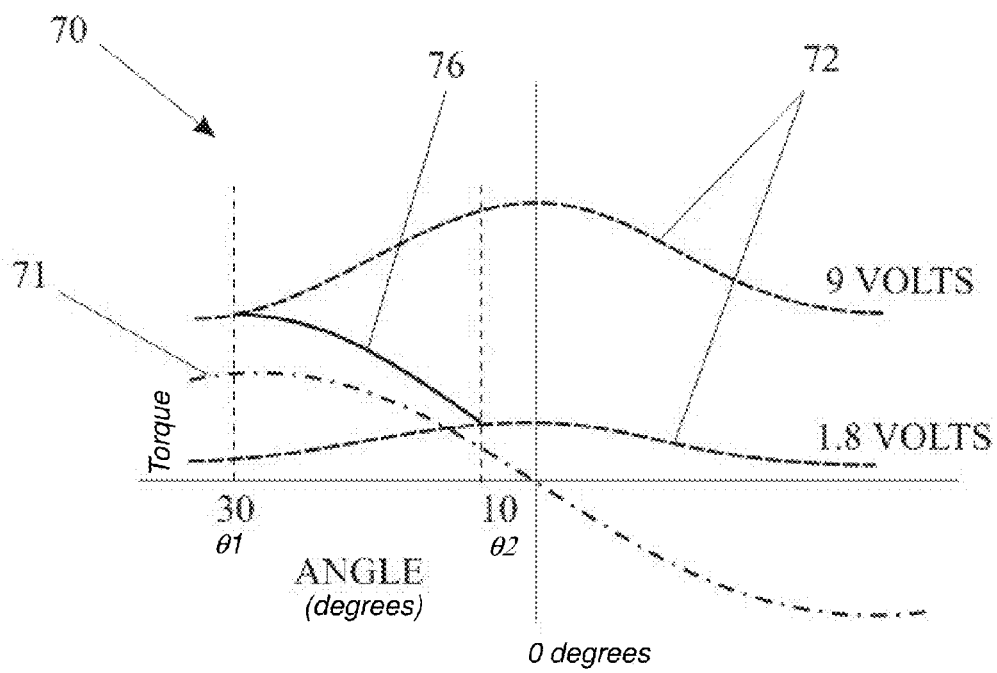
FIG. 4 is a graph of relative torque on a rotor magnet as a function of shutter blade angle.

The schematic views of FIGS. 3A and 3B and the graph of FIG. 4 show how actuator 30 operates in this arrangement, described in detail in commonly assigned co-pending application Ser. No. 13/463,981 to Stephenson, filed May 4, 2012. Actuator 30 has a stator assembly 34 made of low magnetic coercivity metal that conducts a magnetic field. Rotor magnet 38, connected to drive pins 32 (FIG. 1), is pivotally mounted, and magnetically attracted to stator arms 36. Rotor magnet 38 is a permanent magnet that responds to a magnetic flux in stator assembly 34 when coil 64 is under power. Coil 64 is wrapped around stator assembly 34, so that an applied voltage to coil 64 creates a magnetic field that drives rotor magnet 38 away from one position and toward the alternate position. Rotor magnet 38 rotates about an axis A (orthogonal to the page) that lies within stator assembly 34. FIG. 3A shows rotor magnet 38 at a first position, at an angle $\theta 1$ that is about 30 degrees from a reference vertical line L (indicating a position midway between stator arms 36 or equidistant to the opposing stator arms 36). FIG. 3B shows magnet 38 at a second position, at an angle $\theta 2$ that is about 10 degrees from the reference vertical line L.

Using actuator 30 shown in FIGS. 1-3B, drive pins 32 are coupled to rotor magnet 38 and are coupled with shutter blade 40, providing movement within blade slots 42. Absent stops or controls, rotor magnet 38 and blade 40 in this arrangement could switch over an arc of travel of up to 70 degrees between two stable positions based on the direction of current flow through coil 64. However, this full range of travel is not available, since it is desirable that the shutter default to its aperture-blocked position (FIG. 3A) upon power loss. To cause this default behavior, the degree and direction of rotation of rotor magnet 38, as well as its coupled shutter blade 40, are constrained by stop opening 44 in shutter blade 40 as it is driven against stop pin 50 due to the previously described linkage of shutter blade 40 to rotor magnet 38 via drive pins 32 and blade slots 42. In the arrangement of FIGS. 1-3B, this limits rotor magnet 38 to motion that switches between a 30 degree position with angle θ1 (FIG. 3A) and a 10 degree position with angle θ2 (FIG. 3B). At the 10-degree position, aperture 22 is open in the embodiment that is shown. According to an embodiment of the present invention, the 30-degree position of FIG. 3A is the default position corresponding to a closed or blocked-aperture position.

The graph of FIG. 4 shows a plot 70 of relative torque on rotor magnet 38 (coupled to shutter blade 40) as a function of blade 40 angle between its 10 and 30 degree positions. Drive force curves 72 are plotted as a function of the angle with various voltages applied to coil 64. At the zero degree angle position, rotor magnet 38 would be rotated midway between stator arms 36 oriented towards neither of the stator arms 36, pointed in the 12 o'clock position (along the vertical in FIGS. 3A and 3B). A hold curve 71 plots the static magnetic force from rotor magnet 38 as a function of rotor magnet 38 angle when no magnetic field is generated by coil 64. When rotor magnet 38 is at the zero angle position the rotational force from the magnetism in rotor magnet 38 is balanced and there is no force rotating magnet 38 or shutter blade 40. When rotor magnet 38 is rotated so that it is close to one of the two stator arms 36, retention force increases.

When an electrical current is applied to coil 64 of stator assembly 34, the magnetic flux that is formed interacts with the field from the permanent magnet of rotor magnet 38. According to the configuration shown in FIG. 1, the resultant electro-magnetic flux as current is applied at +9 volts or +1.8 volts, oriented to oppose the flux from rotor magnet 38, driving it from its first stopped position at 30 degrees towards the 0 degree position. As drive force curves 72 in FIG. 4 show, the drive force is at its peak at the 0 degree angle and decays as rotor magnet 38 moves away from the 0 degree angle. As is further illustrated by FIG. 4, in order to drive rotor magnet 38 from its aperture-blocked position at 30 degrees, drive force, as shown by drive force curve 72, must exceed the retention force shown by hold curve 71. Using the example plot voltages shown, it is seen that the 9 volt value provides greater torque than holding torque 71 at angle θ1; this is not true when the 1.8 volt value is used.

As FIGS. 1-4 show, stop opening 44 in blade 40 is designed, in conjunction with stop pin 50, to constrain blade motion to one side of torque curve 70 between the 30 degree position (first, aperture blocked position at θ1) and the 10 degree position (second, aperture open position at θ2). In the unpowered state, rotor magnet 38 and, correspondingly, shutter blade 40 that is coupled to magnet 38, is continuously forced or biased to the far side of the curve (the 30 degree or first position) in accordance with the static magnetic forces shown in hold curve 71 in its unpowered state. In applications where laser or other radiation exposure is a concern, this default magnet position and corresponding shutter orientation is favorable; the shutter closes the aperture so that radiation through the aperture is blocked in the event that power is removed.

To move shutter blade 40 from the first position to the second position, bistable actuator 30 is energized. Typically, actuator 30 uses an undersized coil, which is advantaged for lower cost and reduced weight and size. To help prevent burn-out of this undersized coil, continuous actuation is not used. Instead, the actuator 30 coil is energized at an initial high voltage, and a decay circuit is provided so that the drive voltage is initially high enough and is then reduced over time as the shutter blade 40 moves closer to its second position.

The decay circuitry provides an initial higher voltage, nominally 9 volts, to the coil. The voltage applied to the coil then decays to about 1.8 volts after the blade has moved to the open aperture or 10 degree angle. The lower drive force curve 72 is strong enough to overcome magnetic force, shown by hold curve 71, at 10 degrees. The lower power level holds blade 40 open and helps to protect the coil from burning out. When power is removed from the coil, the magnetic force of hold curve 71 is the only force on blade 40, and blade 40 is then driven back to the aperture-blocked or closed position at 30 degrees (FIG. 3A).

Figure 5:
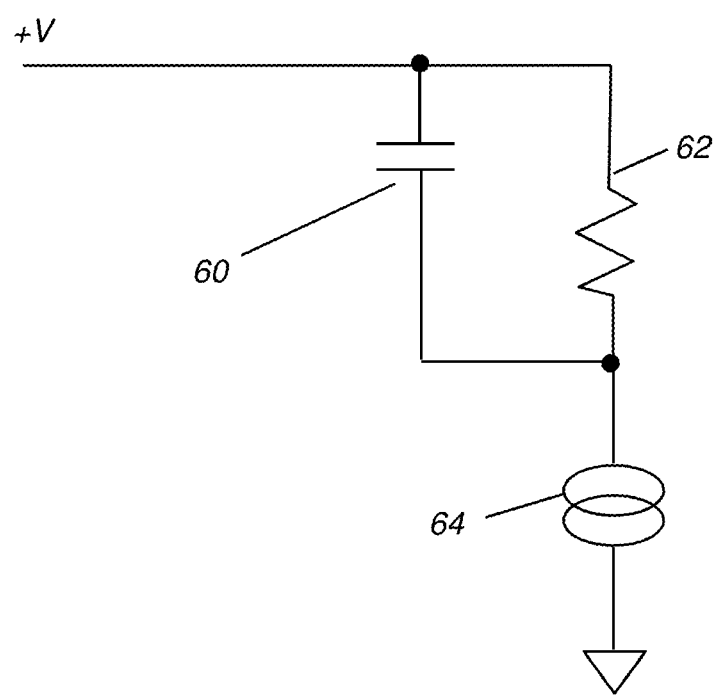
FIG. 5 is a circuit diagram for a drive voltage decay circuit.

The schematic diagram of FIG. 5 shows a circuit that provides a decay drive voltage +V to coil 64 for the FIG. 1-4 shutter apparatus. A capacitor 60 and a resistor 62 are configured in parallel as shown to permit an initial high voltage that decays to a lower voltage. Coil 64 has a high inductance, initially appearing as an open, so that the full drive voltage initially appears across coil 64. Initially, capacitor 60 is at zero voltage (appearing to be closed) and acts as a short across resistor 62; initially, this applies the full 9 volts across coil 64. As the charge field builds in capacitor 60, voltage develops across resistor 62; as this occurs, voltage across coil 64 drops toward 1.8 volts.

The capacitor 60, resistor 62, and coil 64 components are small enough to be mounted on shutter apparatus 10, as shown in FIG. 2. The values for the three electrical elements are sized based on the dynamic motion of blade 40. According to an example embodiment of the present invention, coil 64 is 40 ohms; resistor 62 is 200 ohms; and capacitor 60 is 100 micro-farads. Using these components, when 9V potential is applied across the circuit, the voltage across coil 64 starts at 9V and decays to 1.8V after about 10 milliseconds. Blade 40 moves from its first to its second position within the same 10 millisecond period; actuator 30 correspondingly shifts from a 30 degree to a 10 degree angle position. The final drive voltage is below the voltage level that is required to start blade 40 motion and is also low enough to significantly reduce the risk of coil 64 burn-out over long operating times. The decay process is shown by a decay curve 76 in FIG. 4. The components required to create the circuit in FIG. 5, typically disposed on a circuit board attached to shutter 10 as shown in FIG. 2, provide shutter apparatus 10 as a compact device with a bistable actuator that has magnetic blade return on power down.

While shutter apparatus 10 of FIGS. 1 and 2 provides a usable shutter solution, there are inherent drawbacks to the use of a bistable actuator in the configuration just described. As noted in the background section, the constrained 20-degree travel arc of these devices tends to limit the size of the aperture that can be used in a light path. Embodiments of the present invention expand the angular travel arc of the shutter blade to values in excess of 30 degrees and even to a range of about 60 degrees, enabling shutter apparatus 10 to provide a larger aperture. To accomplish this, embodiments of the present invention provide a constant magnetic bias to the stator of a bistable actuator throughout a range of positive and negative blade angles.

Figure 6:
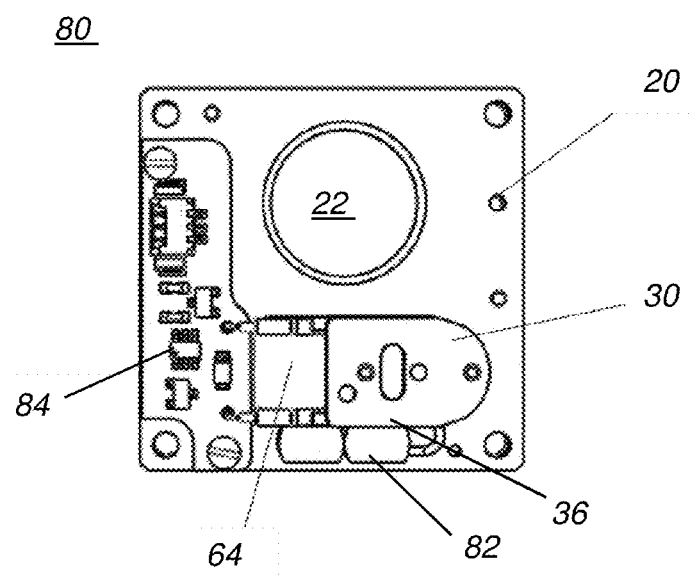
FIG. 6 is a plan view of a shutter apparatus that uses a bistable actuator with additional magnets according to an embodiment of the present invention.

The component layout diagram of FIG. 6 shows a shutter apparatus 80 according to an embodiment of the present invention. Shutter apparatus 80 includes components on frame 20, arranged about aperture 22. In this arrangement, actuator 30 has one or more bias magnets 82 coupled to one of stator arms 36, wherein the bias magnet or magnets 82 provide a continuous magnetic bias force on the rotary magnet and shutter blade. A pulse controller 84 provides the variable drive energy needed to actuate actuator 30, as described in more detail subsequently.

Figure 7A:
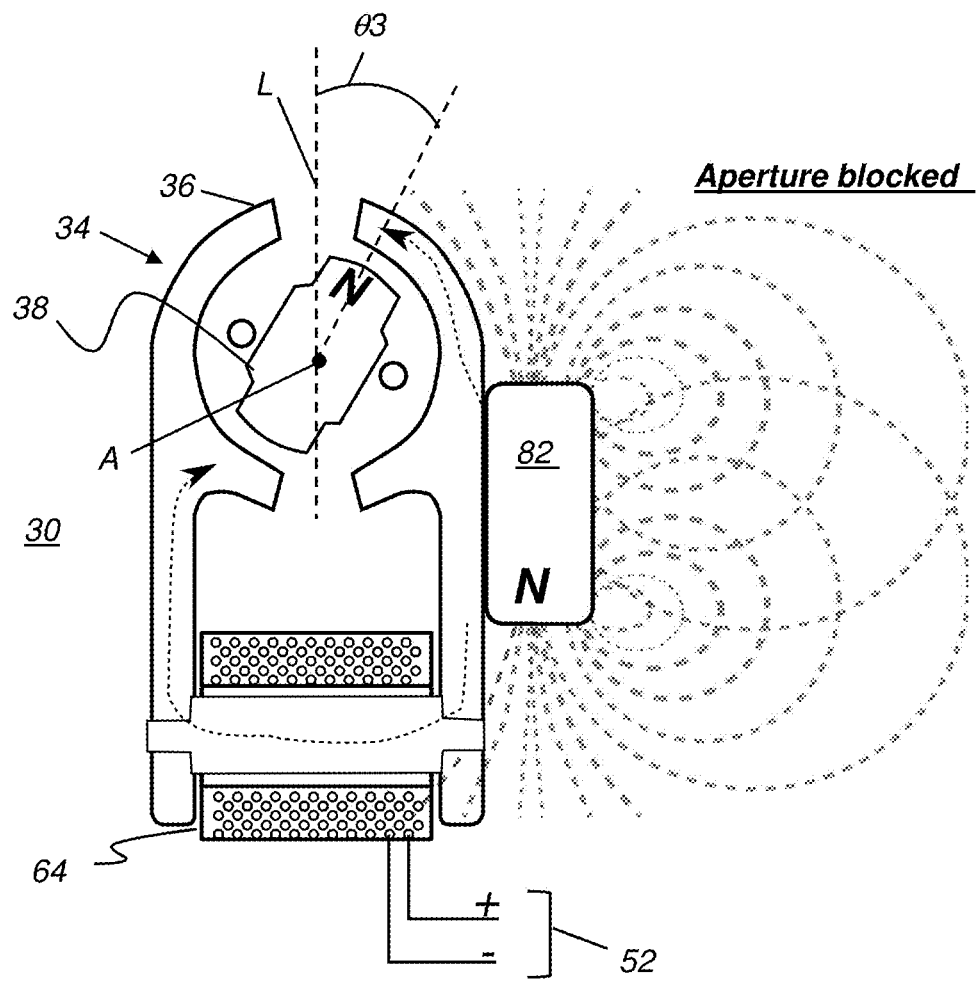
FIG. 7A is a plan view of an actuator in a first position according to an embodiment of the present invention.
Figure 7B:
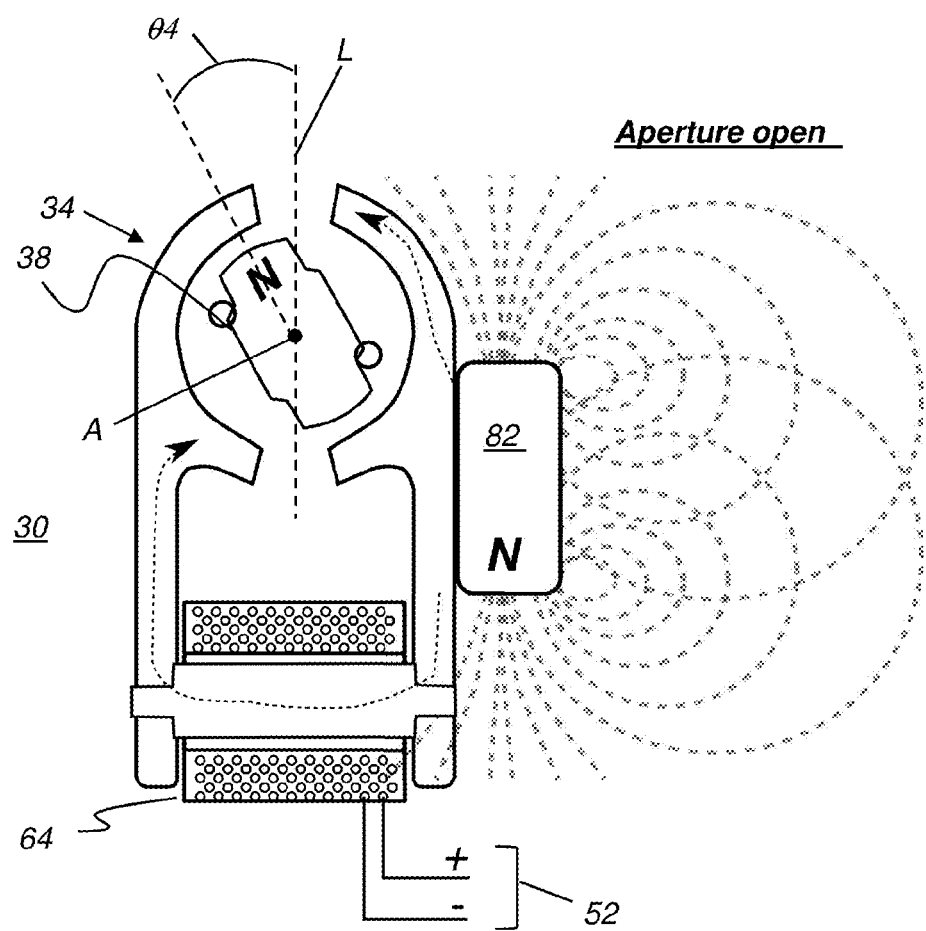
FIG. 7B is a plan view of an actuator in a second position according to an embodiment of the present invention.

The schematic views of FIGS. 7A and 7B show how bias magnet 82 modifies the pattern of movement for rotor magnet 38 in bistable actuator 30 and effectively provides monostable actuator operation. With its magnetic field conducted through stator assembly 34, as noted in dashed lines, bias magnet 82 effects a magnetic pre-bias of stator assembly 34. The magnetic field from bias magnet 82 attracts rotor magnet 38 towards the aperture-blocked position of FIG. 7A, the default or power-down position with angle θ3. When coil 64 is energized at a power input 52 as shown in FIG. 7B, rotor magnet 38 is urged toward the aperture-open position at angle θ4. Compared against the conventional arrangement of FIGS. 3A and 3B, the angular range is increased significantly: relative to the mid-stator position described previously and shown by vertical line L, angle θ3 is at −30 degrees, angle θ4 is at +30 degrees.

Figure 8:
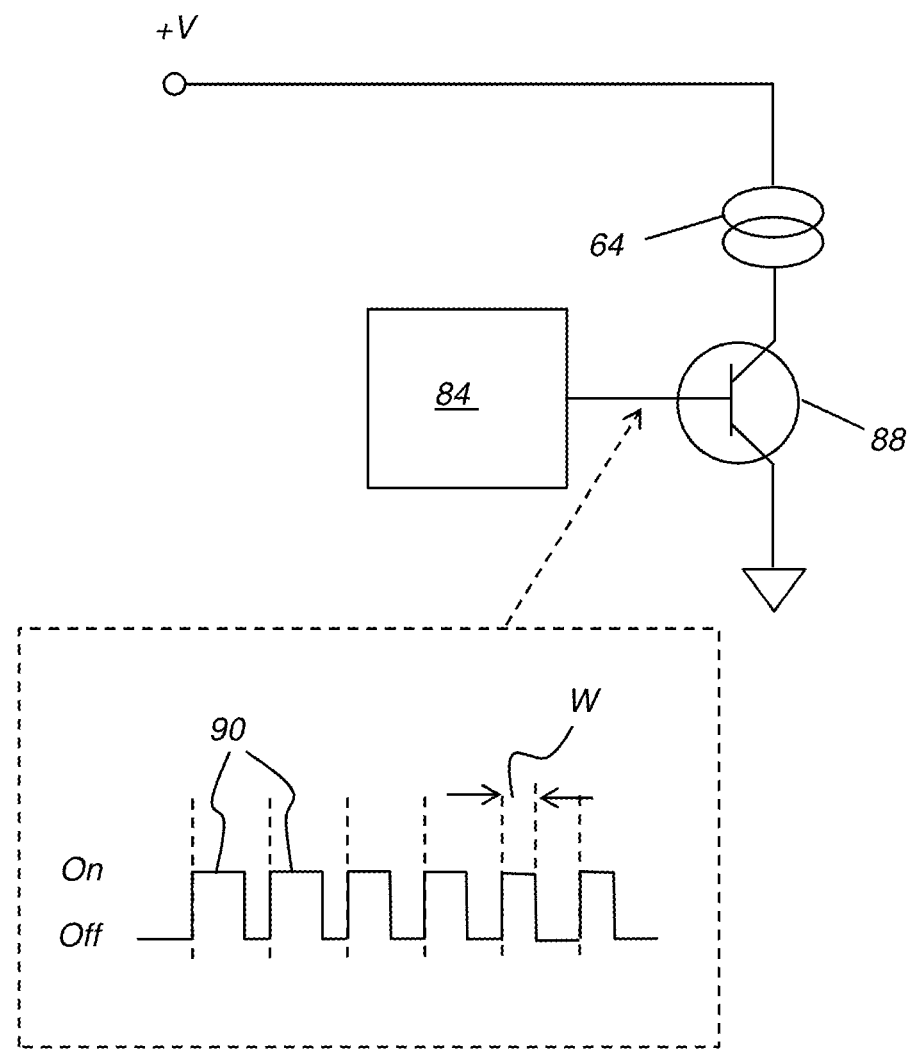
FIG. 8 is a circuit diagram that shows a portion of a circuit for pulse width modulation.

In addition to the pre-bias arrangement that biases the rotation angle of rotor magnet 38, embodiments of the present invention also use a different approach to the problem of providing a variable potential for driving coil 64 and reducing the risk of coil burn-out. Referring to the schematic diagram of FIG. 8, pulse controller 84 provides a variable pulse-width modulation (PWM) drive signal, sending variable width W pulses 90 to a solid-state switch 88, such as a transistor, for directing voltage pulses of corresponding variable width W through coil 64.

Figure 9:
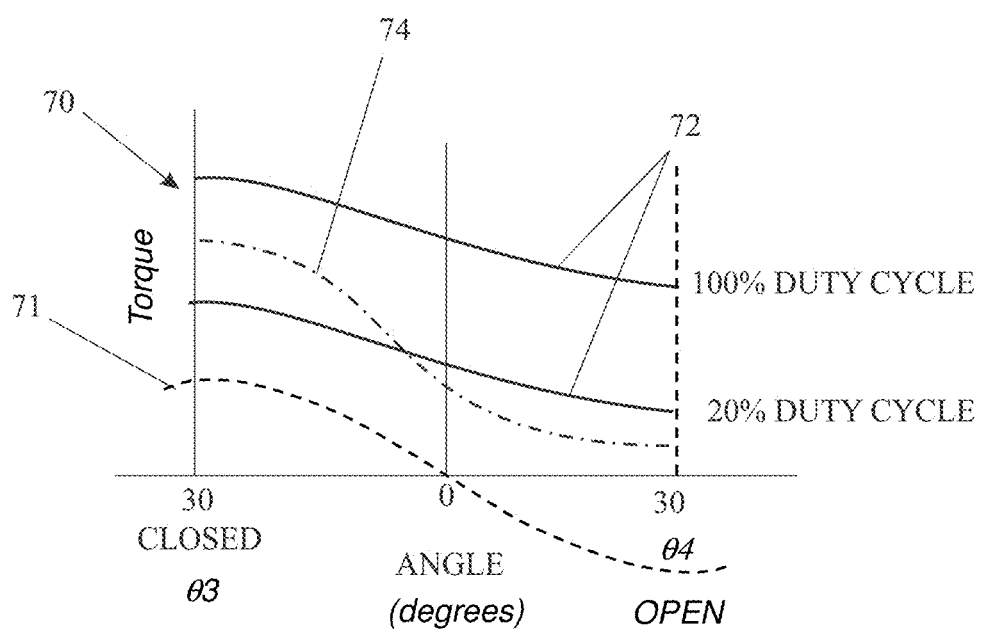
FIG. 9 is a graph that shows relative torque related to angle when using the prebiased magnetic arrangement of an embodiment of the present invention and using pulse width modulation.

The graph of FIG. 9 shows how the broader range of angular motion for rotor magnet 38 is achieved using the combination of magnetic pre-bias of the stator assembly and PWM. The torque on rotor magnet 38 without bias magnet 82 is shown by magnetic hold curve 71. The addition of pre-bias from bias magnet 82 positively shifts the rotational force curve upwards to biased hold curve 74. With the application of bias magnet 82, the drive force across a large angle of rotation is shown by biased hold curve 74, which has a drive force in one direction from −30 degrees (aperture closed or blocked position) to +30 degrees (aperture open position). This provides an increased arc of travel over conventional single-blade shutter devices. By comparison with the graph of FIG. 4, the angular swing of rotor magnet 38 moves to each side of the 0 degree or mid-stator position, from the aperture closed or blocked angle θ3 to the open aperture angle θ4. Drive force curves 72 at 100% PWM duty cycle and at 20% duty cycle are shown. The 100% duty cycle range is needed to overcome the force of biased hold curve 74 in order to move rotor magnet 38 away from its closed position at angle θ3. After the rotation angle moves close to the 0 degree position, the hold force represented by biased hold curve 74 drops significantly. At a lower biased hold force, the duty cycle can be reduced to 20 percent to hold shutter blade 40 open at the angle θ4 position. The PWM duty cycle (the ratio of pulse ON time to total pulse ON/OFF cycle time) can be varied throughout travel or can be reduced after sufficient time has elapsed for shutter blade 40 to move to the open angle θ4 position, where biased hold curve 74 indicates a lower value of opposing force. The use of computer control for drive voltages permits drive curves with characteristics other than those of a continuously decaying curve.

Still referring to FIG. 9, the 20% duty cycle signal shown at the indicated curve 72 is sufficient for holding the open aperture angle θ4 position until drive power is removed. The lower duty cycle helps to prevent coil 64 from a potential burn-out condition. When the electrical field is removed, only biased magnetic force as shown by biased hold curve 74 acts on shutter blade 40. The continuous drive force shown by curve 74 moves shutter blade 40 to closed position θ3 in the absence of power, thus providing power-free blade return.

Bias magnet 82 (FIGS. 6-7B) can be coupled to actuator 30 using adhesive or using a mechanical fastener, bracket, or guide. According to an embodiment of the present invention, a two part epoxy compound is used to bond bias magnet 82 to a stator arm 36 of actuator 30. According to an optional embodiment of the present invention, a holding frame or bracket (not shown) can also be applied to the apparatus to retain bias magnet 82 in position against stator arm 36. Stator arm 36 can be notched, indented, or otherwise featured to seat magnet 82, minimizing or eliminating the need for a separate bracket or adhesive. One or more bias magnets 82 can be used. Where there are multiple magnets 82, magnets are placed so that their fields align appropriately.

Figure 10:
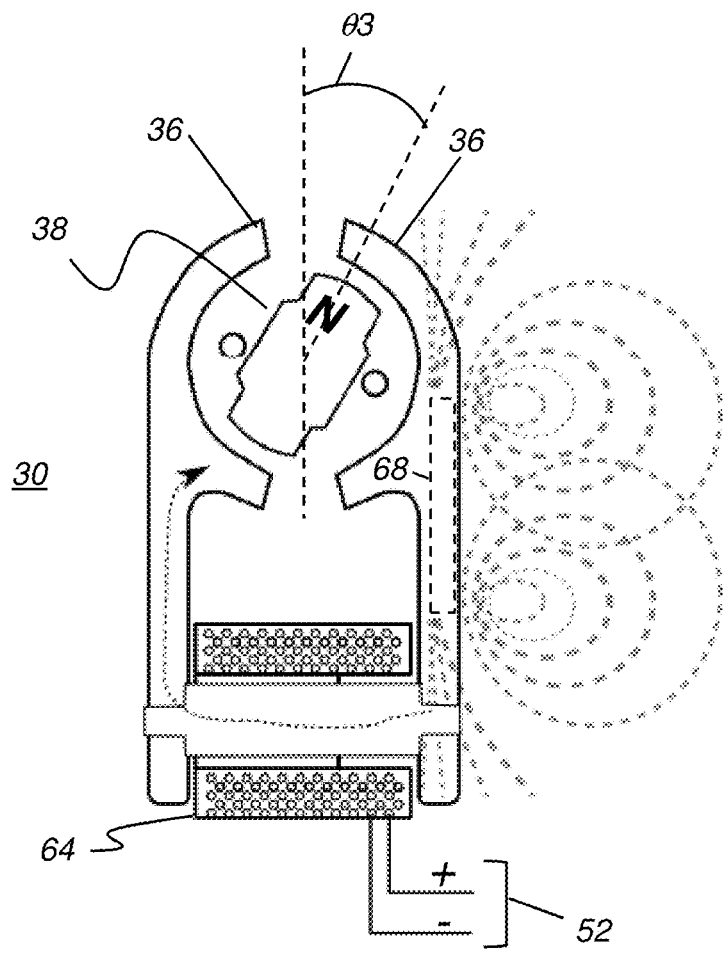
FIG. 10 is a plan view of an actuator with a magnetized stator according to an alternate embodiment of the present invention.

As described previously, it is the pre-bias of the stator assembly 34 that enables power-free blade return. This pre-bias can be provided in a number of ways. According to an alternate embodiment of the present invention, portions of either or both of stator arms 36 are magnetized, eliminating the need for providing and coupling bias magnet 82 to stator arm 36 while providing the magnetic pre-bias conditioning described with reference to FIGS. 7A, 7B, and 9. To provide this function, at least portions of one or more stator arms 36 comprise a hard magnetic material that has been magnetized to provide a permanent magnetic field, as represented in FIG. 10 for the aperture blocked position. The field from a magnetized portion 68 is sufficiently strong to generate a de-energized state that is equivalent to that shown for biased hold curve 74 in FIG. 9. Magnetized portion 68 can also be a notch or indentation for low-profile seating of magnet 82 within stator arm 36, as described previously.

The invention has been described in detail with particular reference to a presently preferred embodiment, but it will be understood that variations and modifications can be effected within the spirit and scope of the invention. For example, two or more magnets 82 can be attached to actuator 30 for providing a biasing force against the rotor magnet. Magnets 82 could be any of a number of types of permanent magnet, formed from iron or compounds including ceramic or rare earth materials such as compounds of neodymium and samarium-cobalt, for example. One or more of magnets 82 could alternately be electromagnets and could be energized as needed to provide variable field strength. Numerous types of fasteners can be employed for attaching a magnet to stator arm 36, including screws, pins, brackets, and clasps, for example. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An optical shutter apparatus comprising:
   a shutter blade that is movable between a first position, blocking at least a portion of an aperture and a second position spaced apart from the first position;
   a rotary actuator having a stator and a magnetic rotor element that is coupled to the shutter blade, wherein the rotary actuator is energizable for moving the shutter blade between the first and second positions, wherein the rotor element rotates about an axis that lies within the stator; and
   at least one permanent magnet that is coupled to the stator and that provides a magnetic field that biases the stator to provide a continuous urging force on the magnetic rotor element.

2. The optical shutter apparatus of claim 1 further comprising a pulse-width modulator controller that switches variable drive power to the rotary actuator, wherein the drive power varies with a rotation angle of the magnetic rotor element.

3. The optical shutter apparatus of claim 1 wherein the magnetic rotor element has an arc of travel that exceeds about 30 degrees.

4. The optical shutter apparatus of claim 1 wherein the at least one permanent magnet is a rare earth magnet.

5. The optical shutter apparatus of claim 1 wherein the shutter blade returns to the first position when energizing power to the rotary actuator is removed.

6. The optical shutter apparatus of claim 1 wherein two or more permanent magnets are coupled to the stator.

7. The optical shutter apparatus of claim 1 wherein a stator arm is featured to seat the at least one permanent magnet.

8. An optical shutter apparatus comprising:
   a shutter blade that is movable between a first position, blocking at least a portion of an aperture and a second position spaced apart from the first position; and
   a rotary actuator having a stator and a magnetic rotor element that is coupled to the shutter blade, wherein the rotary actuator is energizable for moving the shutter blade between the first and second positions, wherein the rotor element rotates about an axis that lies within the stator,
   and wherein
   at least a portion of an arm of the stator comprises a hard magnetic material magnetized to have a permanent magnetic bias that provides a continuous urging force that tends to drive the magnetic rotor element to the first position.

9. The optical shutter apparatus of claim 8 wherein the magnetic rotor element has an arc of travel that exceeds about 30 degrees.

10. The optical shutter apparatus of claim 8 further comprising a pulse-width modulator controller that switches a variable pulse width signal to the rotary actuator, wherein the variable pulse width signal varies with a rotation angle of the magnetic rotor element.

11. A method for blocking a light path comprising:
    coupling a shutter blade to a magnetic rotor element of a rotary actuator, wherein the magnetic rotor element is movable, about an axis that lies within a stator, between a first position and a second position, wherein the shutter blade blocks at least a portion of an aperture when the magnetic rotor element is at the first position;
    providing a magnetic bias to the stator of the rotary actuator by coupling at least one permanent magnet to the stator, wherein the magnetic bias provides a magnetic field that biases the stator to provide a continuous urging force on the magnetic rotor element that urges the shutter blade toward the first position; and
    energizing a pulse-width modulator controller to switch a variable drive signal to the rotary actuator, wherein a pulse width of the drive signal varies with a rotation angle of the shutter blade.

12. The apparatus of claim 1 wherein the at least one permanent magnet is coupled to the stator using an adhesive.

13. The apparatus of claim 1 wherein the at least one permanent magnet is coupled to the stator using a fastener.

14. The method of claim 11 wherein, in moving between the first and second positions, the magnetic rotor element has an arc of travel about the axis that exceeds 30 degrees.

* * * * *